(12) United States Patent
Chambard et al.

(10) Patent No.: US 9,360,063 B2
(45) Date of Patent: Jun. 7, 2016

(54) METHOD FOR THE RECONDITIONING AND USE OF BRAKE DISCS OF THE REAR STATOR TYPE WITH STUDS, ASSEMBLED DISC AND CORRESPONDING STACK OF DISCS

(71) Applicant: MESSIER-BUGATTI-DOWTY, Velizy Villacoublay (FR)

(72) Inventors: Pierre Chambard, Velizy-Villacoublay (FR); Come Dorge, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/541,466

(22) Filed: Nov. 14, 2014

(65) Prior Publication Data

US 2015/0136547 A1    May 21, 2015

(30) Foreign Application Priority Data

Nov. 21, 2013   (FR) ...................................... 13 61459

(51) Int. Cl.
*F16D 65/12*   (2006.01)
*F16D 55/24*   (2006.01)
*B23P 6/00*    (2006.01)
*B64C 25/42*   (2006.01)
(Continued)

(52) U.S. Cl.
CPC . *F16D 55/24* (2013.01); *B23P 6/00* (2013.01); *B64C 25/42* (2013.01); *B64C 25/44* (2013.01); *F16D 65/126* (2013.01); *F16D 65/127* (2013.01); *F16D 2069/0441* (2013.01); *F16D 2200/0047* (2013.01); *Y10T 29/49716* (2015.01)

(58) Field of Classification Search
CPC ..... F16D 55/24; F16D 55/36; F16D 65/0043; F16D 65/127; F16D 65/126; F16D 2069/0441; F16D 2200/0047; B64C 25/42; B64C 25/44; B23P 6/00
USPC ................ 188/218 XL, 71.5, 71.7, 73.1, 214, 188/250 B; 192/70.2, 70.13, 111.1; 29/401.01, 402.01, 402.03, 402.04, 29/402.06
See application file for complete search history.

(56) References Cited

U.S. PATENT DOCUMENTS

| 4,982,818 A | 1/1991 | Pigford |
| 5,099,960 A | 3/1992 | Alev |
| 5,992,577 A | 11/1999 | Souetre |

(Continued)

FOREIGN PATENT DOCUMENTS

EP          0 840 029 A1   5/1998

OTHER PUBLICATIONS

French Search Report for FR 13 61459, dated Sep. 12, 2014.
(Continued)

*Primary Examiner* — Pamela Rodriguez
(74) *Attorney, Agent, or Firm* — Sughrue Mion, PLLC

(57) ABSTRACT

A method for the reconditioning and use of brake discs of the rear stator type with studs. The method includes the steps of using a first disc (12) during a first life, using a second disc (112) during a first life, after the first life of the first disc and the first life of the second disc, machining a friction surface on one of the discs and a rear surface on the other of the discs so that one of the surfaces has at least one shoulder (17) and the other of the surfaces has at least one notch (118). Finally, the first disc is nested in the second disc such that the notch and the shoulder cooperate so as to center the discs.

8 Claims, 3 Drawing Sheets

(51) Int. Cl.
 *B64C 25/44* (2006.01)
 *F16D 69/04* (2006.01)

(56) References Cited

U.S. PATENT DOCUMENTS 7,104,366 B2 * 9/2006 McAfee .................. F16D 55/36
 188/71.5
7,168,528 B1 * 1/2007 Bok ........................ F16D 55/36
 188/71.7
7,900,751 B2 * 3/2011 Walker ................ F16D 65/0043
 188/71.5
2008/0196982 A1 8/2008 Cress et al.

OTHER PUBLICATIONS

Form FR 237 for FR 13 61459, dated Sep. 12, 2014.

* cited by examiner

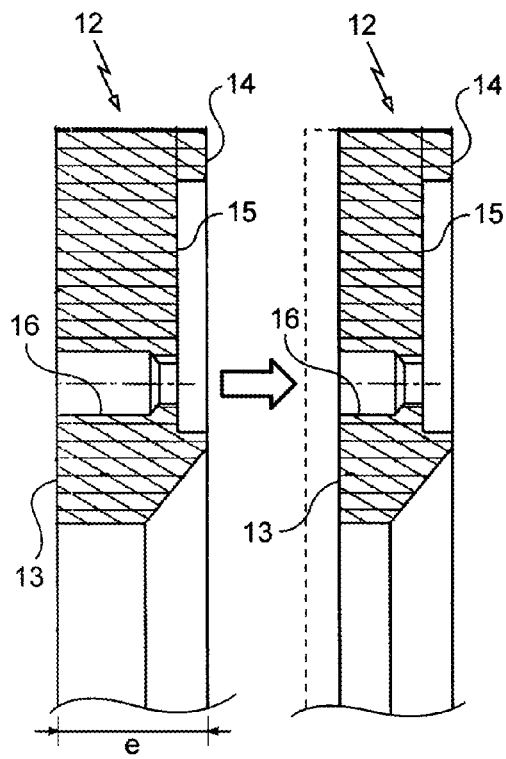
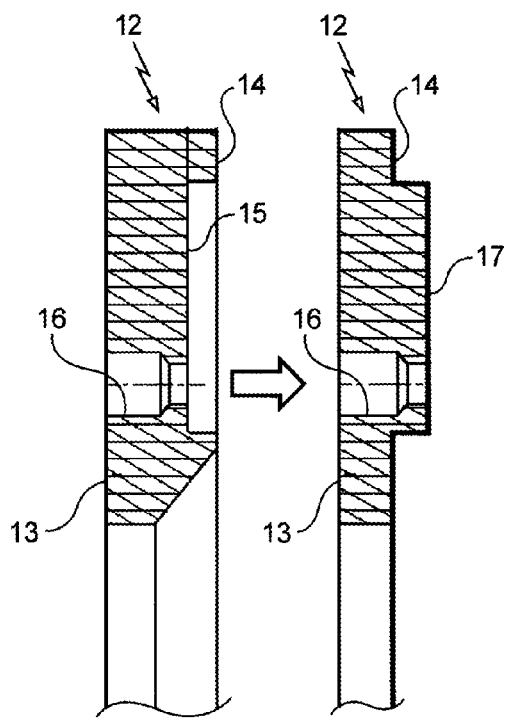
Fig. 2a    Fig. 2b      Fig. 3a    Fig. 3b
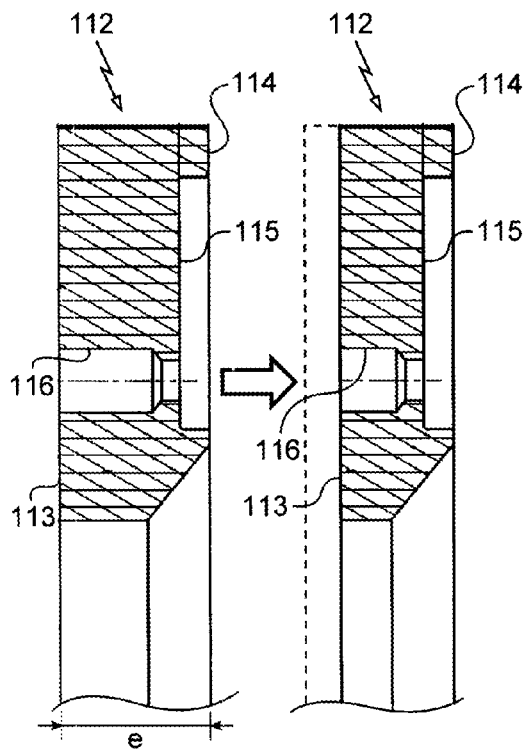
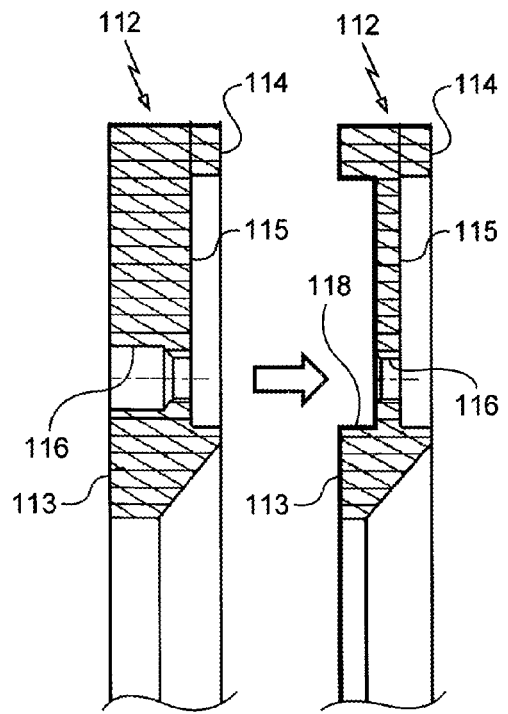
Fig. 4a    Fig. 4b      Fig. 5a    Fig. 5b

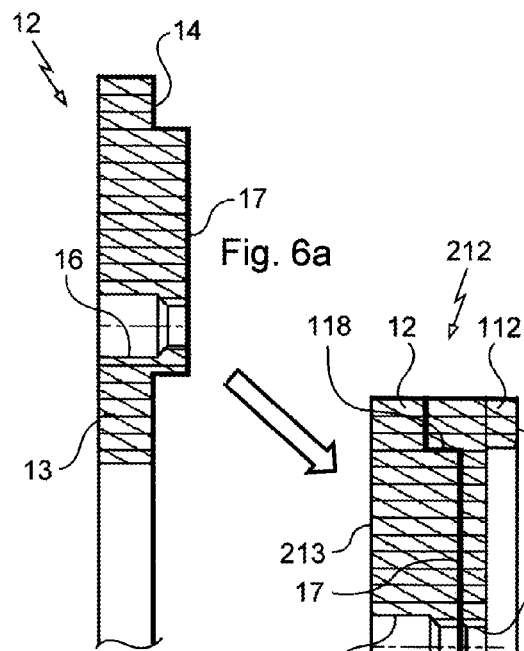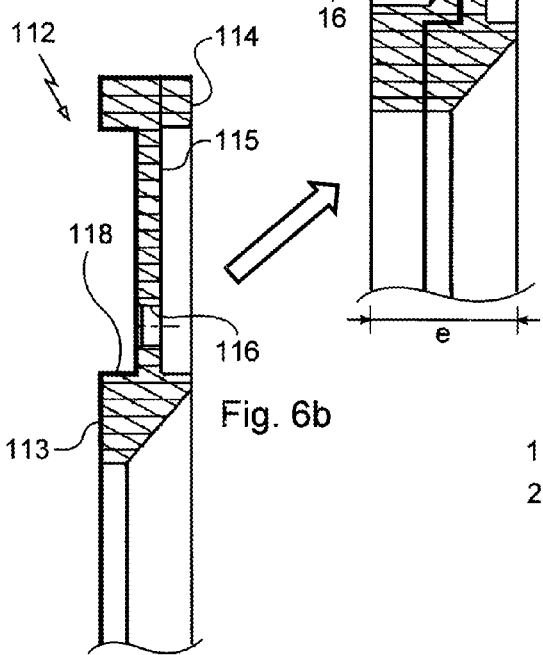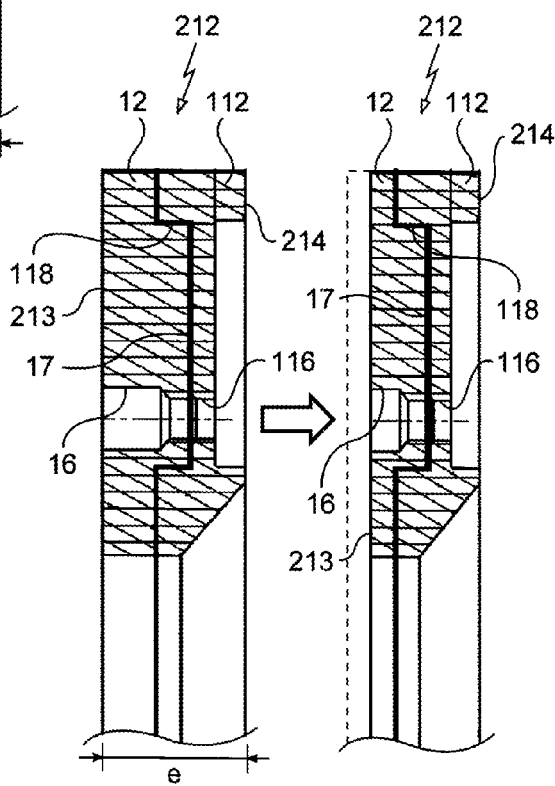

METHOD FOR THE RECONDITIONING AND USE OF BRAKE DISCS OF THE REAR STATOR TYPE WITH STUDS, ASSEMBLED DISC AND CORRESPONDING STACK OF DISCS

CROSS-REFERENCE TO RELATED APPLICATION

This application claims priority to French Patent Application number 13 61459, filed on Nov. 21, 2013, the entire disclosure of which is incorporated herein by reference.

The invention relates to a method for the reconditioning and use of brake discs of the rear stator type with studs. The invention further relates to an assembled disc designed to be used as a rear stator disc with studs from a stack of brake discs and a stack of brake discs comprising such an assembled disc.

TECHNICAL BACKGROUND TO THE INVENTION

Braking systems in the majority of modern aircraft comprise disc brakes stacked around a torsion tube and brake actuators carried by a ring and controlled so as to apply a braking force to the discs in order to exert a braking torque on the braked wheels of the aircraft, tending to decelerate said aircraft. The stator discs which are fixed to the torsion tube and the rotor discs which are fixed in rotation to the rim of the wheel are included amongst the discs. More particularly, the front stator disc which is the stator disc against which the brake actuator bears, the rear stator disc which rests on a part of the torsion tube and the intermediate stator discs which rest between two rotor discs are specified as the stator discs.

The different discs are worn during braking which requires maintenance operations to be carried out regularly on the stack of discs so as to replace some or all of the discs of the stack so that the brake is always able to respond to the braking stresses which are imposed thereon. Once the wear stroke of the stack of brakes is used up, the stack of discs is removed from the brake and sent to an inspection-reconditioning service.

As regards the rear stator discs, it is known to use a disc during a first life as a rear stator disc of a first stack of brake discs, said disc having a thickness at the start of the first life such that it is called the "thick disc" at the start of the first life. It is known to use said disc during a second life as a rear stator disc in a second stack of brake discs, said disc having a thickness at the start of the second life such that it is called the "thin disc" at the start of the second life.

By means of such a method, a rear stator disc may be used during two lives as long as the front stator disc of the stack of discs under consideration is each time of appropriate size. Thus, when the rear stator disc is "thick" the front stator disc has to be "thick" i.e. have a thickness which is substantially identical to that of the rear stator disc at the start of the second life, the rotor discs then being "thin" and the intermediate stator discs then being "thick". When the rear stator disc is "thin" the front stator disc has to be "thin" i.e. have a thickness which is substantially identical to that of the rear stator disc at the start of the first life, the rotor discs then being "thick" and the intermediate stator discs then being "thin".

The use and reconditioning of a rear stator disc thus involves having front stator discs of suitable size. In particular, it has been shown that two types of front stator discs should always be available (a front "thick" stator disc and a front "thin" stator disc) so as to be able to be adapted to the rear stator disc used in a stack of discs under consideration.

The method of the reconditioning and use of a rear stator disc has thus proved to be complex to implement.

OBJECT OF THE INVENTION

One object of the invention is to propose a simplified method for the reconditioning and use of brake discs of the rear stator type with studs.

BRIEF DESCRIPTION OF THE INVENTION

The invention relates to a method for the reconditioning and use of aircraft brake discs of the rear stator type with studs, the method comprising the steps of:
- using a first disc during a first life as the rear stator disc with studs from a first stack of brake discs, the first disc having an initial thickness at the start of the first life,
- using a second disc during a first life as the rear stator disc with studs from a second stack of brake discs, the second disc at the start of the first life being substantially identical to the first disc at the start of the first life,
- after the first life of the first disc and the first life of the second disc, machining a friction surface on one of the discs and a rear surface on the other of the discs so that one of said surfaces comprises at least one shoulder and the other of said surfaces comprises at least one notch capable of cooperating with said shoulder,
- nesting the first disc in the second disc such that the notch and the shoulder cooperate so as to centre the discs,
- fixing the two discs to one another to form an assembled disc, the assembled disc having a thickness which is substantially identical to the initial thickness,
- fixing studs to the assembled disc,
- using the assembled disc during an additional life as the rear stator disc with studs from a third stack of brake discs.

Thus, the assembled disc has the same thickness as the first disc at the start of the first life or the second disc at the start of the first life. Thus it does not prove necessary to adjust the thicknesses of the other discs from a stack of brake discs under consideration as the first disc is used at the start of the first life, the second disc is used at the start of the first life or the assembled disc is used (and as a result the first disc and the second disc at the start of the second life). Moreover, it is only necessary to machine one surface of the first disc and the second disc, the other surface remaining identical apart from possible surfacing. The assembled disc thus has an external shape which is identical to that of the first disc at the start of the first life or the second disc at the start of the first life such that it is not necessary to adjust the shapes of the other discs from a stack of brake discs under consideration or associated torsion tube as the first disc is used at the start of the first life, the second disc is used at the start of the first life or the assembled disc is used.

This simplifies, therefore, the reconditioning and use of the rear stator discs with studs.

Moreover, the first disc and the second disc are both used during two lives before it is necessary to replace them by new discs. The duration of the life of the first disc and the second disc is thus optimized.

Moreover, the initial thickness of the first disc and the second disc could be lower than that of the so-called "thick" disc of the prior art due to the method for the reconditioning and use of the invention. This makes it possible to provide new discs at a lower cost.

For the entire present application, "life" is understood as a cycle of use of a disc in a stack of discs when the stack of discs is mounted on an aircraft and is subjected to successive braking, the life starting when the stack of discs is mounted on the aircraft and stopping when the stack of discs is dismantled from the aircraft and forwarded to a workshop for inspection and maintenance.

Similarly, "disc" is understood as the generally annular friction element which has the initial thickness at the start of the first life and which is subjected to wear in the region of its friction surface or its friction surfaces during each of the subsequent lives, the wear causing a reduction in its thickness.

"Rear stator disc" is understood as the stator disc which rests on part of the torsion tube. "Front stator disc" is understood as the stator disc against which the brake actuator bears.

"Friction surface" is understood as the principal surface of the rear (or front) stator disc which bears against a principal surface of one of the rotor discs from a stack of discs under consideration. "Rear surface" is understood as the principal surface of the rear (or front) stator disc which opposes the principal surface called the "friction surface" and which thus bears against the torsion tube (or against the brake actuator).

For the present application, "substantially equal thickness" is understood to mean that the thickness has a value close to that specified, typically in a range of 5% of the specified thickness.

The invention also relates to an assembled disc designed to be used as a rear stator disc with studs from a stack of brake discs, said disc comprising:
- a first disc having been used during a first life as a rear stator disc with studs from a first stack of brake discs, the first disc comprising a first principal surface comprising at least one shoulder,
- a second disc having been used during a first life as a rear stator disc with studs from a second stack of brake discs, the second disc comprising a second principal surface which bears against the first principal surface of the first disc and which comprises at least one notch in which the shoulder of the first disc is received, the notch and the shoulder cooperating so as to centre the discs,
- means for fixing the two discs together.

The invention further relates to a stack of discs comprising the assembled disc of the invention as the rear stator disc with studs.

BRIEF DESCRIPTION OF THE DRAWINGS

The invention will be more clearly understood by reading the following description with reference to the figures of the accompanying drawings, in which:

FIGS. 2a, 2b are schematic views showing a rear stator disc with studs from the stack of brake discs illustrated in FIG. 1, respectively at the start and the end of its first life, FIGS. 3a, 3b are schematic views showing the disc illustrated in FIGS. 2a and 2b, respectively at the end of its first life and at the start of its second life, FIGS. 4a, 4b are schematic views showing a further rear stator disc with studs from a second stack of discs, respectively at the start and at the end of its first life, FIGS. 5a, 5b are schematic views showing the disc illustrated in FIGS. 4a and 4b, respectively at the end of its first life and at the start of its second life, FIGS. 6a, 6b and 6c are schematic views respectively showing the disc at the start of the second life illustrated in FIG. 3b, the disc at the start of the second life illustrated in FIG. 5b and an assembled disc formed from the association of the disc illustrated in FIG. 6a and the disc illustrated in FIG. 6b, FIGS. 7a, 7b are schematic views showing the assembled disc illustrated in FIG. 6c, respectively at the start and at the end of its additional life.

DETAILED DESCRIPTION OF THE INVENTION

Figure 1:
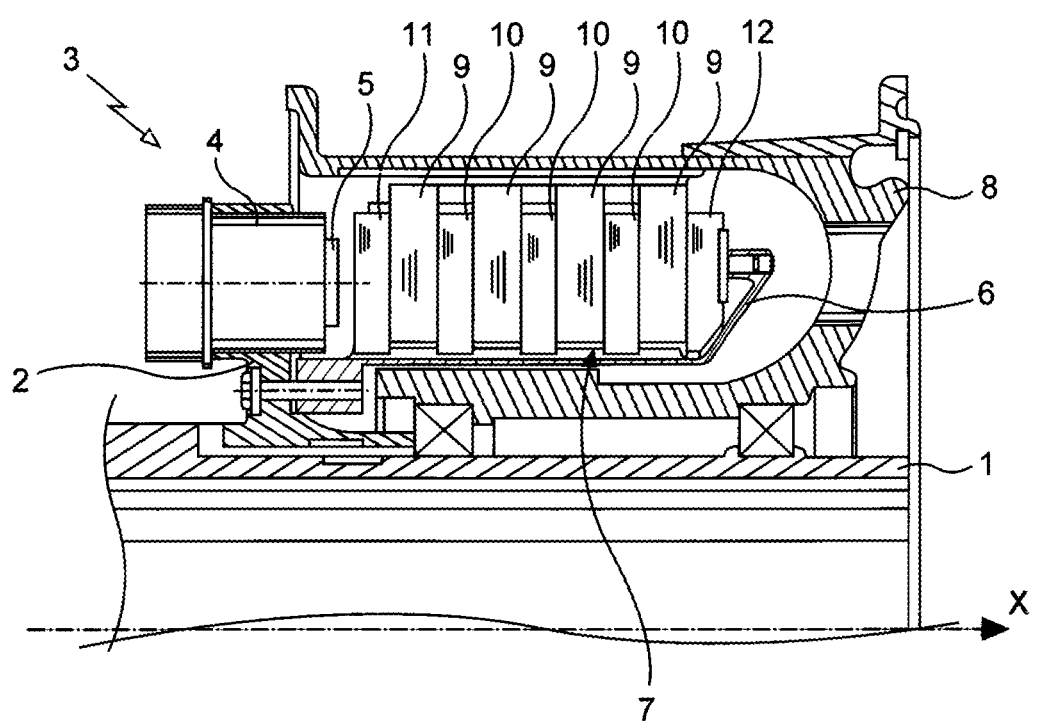
FIG. 1 is a sectional view of an electromechanical brake.

FIG. 1 shows a brake which is designed for braking a wheel of an aircraft mounted on an axle 1 having the axis X.

The brake comprises a ring 2 mounted on the axle 1 and fixed in rotation relative thereto by means, not shown. The ring 2 bears brake actuators 3 (one thereof being shown in FIG. 1) which each comprise a housing 4 in which a pusher 5 is mounted so as to slide in an axial direction parallel to the axis X and to exert a braking force selectively on a first stack of discs 7, alternately comprising rotor discs 9 fixed in rotation to a rim 8 of the wheel and stator discs 10, 11, 12 fixed in rotation by a torsion tube 6 fixed to the ring 2.

The rotor discs 9 and the stator discs 10, 11, 12 may be made of any material suitable for braking, such as for example carbon. Preferably, the rotor discs and the stator discs are made of the same material such that the different friction surfaces of the discs wear in a substantially identical manner.

The pusher 5 may be actuated, for example, by an electric motor of the associated actuator, the motor being arranged so as to rotate one of the elements of a screw-nut system, for example of the ball or roller type, the pusher 5 being fixed to the other of the elements of the system. An anti-rotation member thus prevents the pusher 5 from rotating.

As is more clearly visible in FIG. 2a, the first stack of discs comprises, in particular, a rear stator disc with studs 12, called hereinafter the "first disc". The first disc 12 has a principal surface 13, called the friction surface, which is opposite one of the rotor discs from the first stack of discs 7. The first disc 12 further comprises a principal surface 14, called the rear surface, which is opposite the friction surface 13 and which is opposite the torsion tube 6.

The rear surface 14 comprises a plurality of housings 15 (one thereof being illustrated here) in which studs (not illustrated in FIG. 2a) are arranged. The first disc 12 thus comprises drilled holes 16 (one thereof being illustrated here) passing through the disc from its friction surface 13 to its rear surface 14, each drilled hole 16 opening into one of the housings 15 of the rear surface 14. A rivet (not illustrated in FIG. 2a) extending in each drilled hole 16 permits each stud to be fixed to the first disc 12.

The application of a braking force forces the discs from the first stack of discs 7 to rub against one another such that a portion of the kinetic energy of the aircraft is dissipated as heat. However, the friction of the discs inevitably causes the wear of the different friction surfaces of the rotor discs and stator discs.

FIG. 2a thus shows the first disc 12 at the start of the first life, said first disc 12 therefore having an initial thickness e. The first disc 12 is thus a one-piece disc. The first disc 12 is used as such during the first life in the first stack of discs 7.

During said first life, the first disc 12 wears in the region of its friction surface 13. This causes a reduction in the initial thickness e.

Thus, with reference to FIG. 2b, at the end of the first life, the first disc 12 has a thickness which is less than the initial thickness e. The reduction in the thickness of the disc 12 during the first life is illustrated in dashed lines.

With reference to FIGS. 3a and 3b, at the end of the first life, the studs and the rivets are thus separated from the first disc 12. Then, the friction surface 13 of the first disc 12 is surfaced here to improve the surface state of said surface 13.

According to the invention, the rear surface 14 of the first disc 12 is machined so that at the end of the machining process the rear surface 14 comprises a plurality of shoulders 17 as described below.

Thus, at the end of the machining process and thus at the start of the second life, the first disc 12 no longer has housings 15 but only shoulders 17. The first disc 12 from now on has a friction surface 13 which is substantially identical to its friction surface at the start of its first life and a rear surface 14 which is very different, however, from its rear surface at the start of its first life. The drilled holes 16 always extend from the friction surface 13 to the rear surface 14 through the thickness of the first disc 12.

According to the invention, with reference to FIGS. 4a and 4b, a second disc 112 is used during a first life as a rear stator disc with studs from a second and new stack of brake discs (not illustrated here). Naturally, said new stack of discs may be mounted in the same position as the first stack of discs 7.

The second disc 112 at the start of the first life is identical to the first disc 12 at the start of the first life. The second disc 112 thus has a principal surface 113 called the friction surface which is opposite one of the rotor discs of the second stack of discs. The second disc 112 further comprises a principal surface 114 called the rear surface which is opposite the friction surface 113 and which is opposite the torsion tube.

As is the case for the first disc 12, the rear surface 114 of the second disc 112 comprises a plurality of housings 115 in which studs are arranged. The second disc 112 thus comprises drilled holes 116, passing through the disc from its friction surface 113 to its rear surface 114, each drilled hole 116 opening into one of the housings 115 of the rear surface 114. A rivet extending in each drilled hole 116 makes it possible to fix each stud to the second disc 112. The dimensions of the housings and the drilled holes, and in turn the disc, are identical between the first disc 12 and the second disc 112 as is the number of drilled holes and housings.

FIG. 4a thus shows the second disc 112 at the start of the first life, said second disc 112 therefore having an initial thickness e. The second disc 112 is thus a one-piece disc. The second disc 112 is used as such during the first life in the second stack of discs.

During said first life, the second disc 112 wears in the region of its friction surface 113. This causes a reduction in the initial thickness e.

Thus, with reference to FIG. 4b, at the end of the first life, the second disc 112 has a thickness which is less than the initial thickness e and which is substantially equal to the thickness of the first disc 12 at the end of its first life. The reduction in thickness of the second disc 112 during the first life is illustrated in dashed lines.

With reference to FIGS. 5a and 5b, at the end of the first life of the second disc 112, the studs and the rivets are separated from the second disc 112. Then the rear surface 114 of the second disc is surfaced here to improve the surface state of said surface.

According to the invention, the friction surface 113 of the second disc 112 is machined so that at the end of the machining process the friction surface 113 comprises a plurality of notches 118 as described below, each notch 118 being capable of receiving one respective shoulder 17 of the first disc 12.

Thus, at the end of the machining process and thus at the start of the second life, the second disc 112 no longer has a smooth friction surface but a friction surface 113 comprising notches 118. The second disc 112 from now on has a rear surface 114 which is substantially identical to its rear surface at the start of the first life and a friction surface 113 which is very different, however, from its friction surface at the start of its first life. The drilled holes 116 always extend from the friction surface 113 to the rear surface 114 via the thickness of the second disc 112.

With reference to FIGS. 3b, 5b and 6a to 6c, once the first disc 12 is machined and the second disc 112 is machined, the first disc 12 and the second disc 112 are nested together such that the notches 118 and the shoulders 17 cooperate so as to centre the two discs.

The first disc 12 and the second disc 112 are machined so that once the two discs are nested together, the assembly formed by the first disc 12 and the second disc 112 has a thickness which is identical to the initial thickness e.

Preferably, the two discs 12, 112 are machined so that once the two discs are nested together, each drilled hole 16 of the first disc 12 is coaxial with one of the drilled holes 116 of the second disc 112.

According to one particular embodiment, the first disc 12 is machined so that the number of shoulders 17 is identical to the number of housings 115 of the second disc 112 and the second disc 112 is machined so that the number of notches 118 is identical to the number of housings 115 of the second disc 112. In this manner, the first disc 12 and the second disc 112 comprise an identical number of respective shoulders and notches.

In particular, the first disc 12 is machined so that the diameter of the shoulders 17 is identical to that of the housings 115 of the second disc (the second disc 112 being thus machined so that the diameter of the notches 118 is identical to that of the housings 115).

The first disc 12 in this case is machined so that each shoulder 17 is respectively coaxial with one of the housings 115 (the second disc 112 thus being machined so that each notch 118 is respectively coaxial with one of the housings 115). In this manner, the different drilled holes all pass through one respective shoulder 17 of the rear surface 14 (for the first disc 12) or all emerge in the region of one respective notch 118 of the friction surface 113 (for the second disc 112).

Once the first disc 12 and the second disc 112 are nested together, studs are inserted into the housings of the rear surface 114 of the second disc 112.

Then the rivets are successively inserted into the drilled holes 16 of the first disc 12, then through the drilled holes 116 of the second disc 112 and then through the studs. The rivets thus permit the first disc 12, the second disc 112 and the studs to be fixed together.

Thus fixed together, the first disc 12 and the second disc 112 form an assembled disc 212. The friction surface 213 of the assembled disc 212, namely the surface designed to be in contact with a rotor disc, is thus the friction surface 13 of the first disc 12 and the rear surface 214 of the assembled disc 212, namely the surface designed to be in contact with the torsion tube, is thus the rear surface 114 of the second disc 112.

The assembled disc 212 advantageously has an external shape which is identical to that of the first disc 12 at the start of the first life and to that of the second disc 112 at the start of the first life. More specifically, the friction surface 13 of the first disc 12 has only been surfaced and the rear surface 114 of the second disc 112 has only been surfaced, the rear machined surface 14 of the first disc 12 and the machined friction surface 113 of the second disc 112 resting against one another.

It will be noted that the appropriate machining of the first disc 12 and of the second disc 112 advantageously makes it possible to reuse the drilled holes already formed in the first disc 12 and the second disc 112 to position the rivets. It is thus not necessary to redrill the first disc 12 and the second disc 112 during the reconditioning thereof.

Similarly, the appropriate machining of the first disc 12 and the second disc 112 advantageously makes it possible to reuse the housings 115 of the second disc 112 to position the studs. It is thus not necessary to create new housings for studs during the reconditioning of the first disc 12 and the second disc 112.

The reconditioning of the first disc 12 and of the second disc 112 has thus been shown to be simple.

With reference to FIG. 7a, the assembled disc 212 is used as a rear stator disc with studs in a third and new stack of discs. The first disc 12 and the second disc 112 are thus used in the third stack of discs during a second life. Naturally, said new stack of discs may be mounted in the same position as the first stack of discs 7.

During the additional life, the assembled disc 212 wears in the region of its friction surface 213, i.e. in the region of the friction surface 13 of the first disc 12. This causes a reduction in the thickness of the assembled disc 212 and thus of the first disc 12.

With reference to FIG. 7b, at the end of the additional life, the assembled disc 212 is discarded, i.e. the first disc 12 and the second disc 112 are finally discarded at the end of their second life. The reduction in thickness of the assembled disc 212 during the additional life is illustrated in dashed lines.

Naturally, the invention is not limited to the embodiment described and variants thereof may be provided without departing from the scope of the invention as defined by the claims.

The method is also applicable to discs of brakes other than an electromechanical brake such as, for example, a hydraulic brake.

The shoulders could be carried by the second disc and the notches by the first disc. The same disc could comprise both notches and shoulders and the other disc could comprise corresponding shoulders and notches. The number of notches and the shape of the notches could be different from what has been described as long as the notches are shaped and of a number so that they enable the costs of machining the first disc and/or the second disc to be reduced to a maximum extent, whilst guaranteeing torque take-up between the first disc and the second disc nested together. The same reasoning obviously applies to the shoulders. Thus, the number of notches and shoulders could be different from the number of housings.

Although, in this case, the surfaces of the discs are either machined or surfaced at the end of the first life, it is conceivable that no surfacing is carried out. For example, the rear surface of the second disc might not be surfaced.

Although in this case the assembled disc is discarded at the end of the additional life, it is conceivable that said disc is not discarded. For example, it is possible for the second disc not to be discarded at the end of its second life (namely at the end of the additional life of the assembled disc) and to be used during a third life.

The first disc and the second disc could be fixed together using fixing means other than those used to fix the studs to the assembled disc.

The invention claimed is:

1. Method for the reconditioning and use of aircraft brake discs of the rear stator type with studs, the method comprising the steps of:

using a first disc (12) during a first life as the rear stator disc with studs from a first stack of brake discs, the first disc having an initial thickness at the start of the first life, using a second disc (112) during a first life as the rear stator disc with studs from a second stack of brake discs, the second disc at the start of the first life being substantially identical to the first disc at the start of the first life, after the first life of the first disc and the first life of the second disc, machining a friction surface (13) on one of the discs and a rear surface (114) on the other of the discs so that one of said surfaces comprises at least one shoulder (17) and the other of said surfaces comprises at least one notch (118) capable of cooperating with said shoulder, nesting the first disc in the second disc such that the notch and the shoulder cooperate so as to centre the discs, fixing the two discs to one another to form an assembled disc (212), the assembled disc having a thickness which is substantially identical to the initial thickness, fixing studs to the assembled disc, using the assembled disc during an additional life as the rear stator disc with studs from a third stack of brake discs.

2. Method according to claim 1, in which the first disc (12) and the second disc (112) are machined so that the friction surface (113) carries the notch (118) and the rear surface (14) carries the shoulder (17).

3. Method according to claim 1, in which the studs are fixed to the first disc (12) at the start of the first life by first rivets passing through drilled holes (16) of the first disc and in which studs are fixed to the second disc (112) at the start of the first life by second rivets passing through the drilled holes (116) of the second disc, the first disc and the second disc being machined so that each drilled hole of the first disc is respectively coaxial with one of the drilled holes of the second disc when the two discs are assembled, the studs thus being fixed to the assembled disc by third rivets successively passing through the drilled holes of the first disc, the drilled holes of the second disc and the studs, the third rivets thus also fixing the first disc to the second disc.

4. Method according to claim 3, in which the first disc (12) and the second disc (112) are machined so that the shoulder (17) is traversed by one of the drilled holes of one of the discs and one of the drilled holes of the other of the discs opens into the corresponding notch (118).

5. Method according to claim 1, wherein the one of the discs, whose friction surface (113) thereof has been machined, comprises a rear surface (114) opposite said friction surface, said rear surface of said one of the disks comprising housings (115) to receive studs, the first disc (12) and the second disc (112) being machined such that the notch is coaxial and of identical diameter to one of said housings and such that the shoulder is coaxial and of identical diameter to the corresponding notch.

6. Method according to claim 1, wherein the one of the discs, whose friction surface (113) thereof has been machined, comprises a rear surface (114) opposite said friction surface, said rear surface of said one of the disks comprising housings (115) to receive studs, the first disc (12) and the second disc (112) being machined so as to comprise as many corresponding notches (118) and shoulders (17) as housings.

7. Assembled disc (212) designed to be used as a rear stator disc with studs from a stack of brake discs, said disc comprising:

a first disc (12) having been used during a first life as a rear stator disc with studs from a first stack of brake discs, the first disc comprising a first principal surface comprising at least one shoulder (17), a second disc (112) having been used during a first life as a rear stator disc with studs from a second stack of brake discs, the second disc comprising a second principal surface which bears against the first principal surface of the first disc and which comprises at least one notch (118) in which the shoulder of the first disc is received, the notch and the shoulder cooperating so as to centre the discs, means for fixing the two discs together.

8. A stack of brake discs comprising an assembled disc (212) used as a rear stator disc with studs in said stack of brake discs, said assembled disc comprising:

a first disc (12) having been used during a first life as a rear stator disc with studs from a first stack of brake discs, the first disc comprising a first principal surface comprising at least one shoulder (17), a second disc (112) having been used during a first life as a rear stator disc with studs from a second stack of brake discs, the second disc comprising a second principal surface which bears against the first principal surface of the first disc and which comprises at least one notch (118) in which the shoulder of the first disc is received, the notch and the shoulder cooperating so as to centre the discs, means for fixing the two discs together.

* * * * *